UNITED STATES PATENT OFFICE.

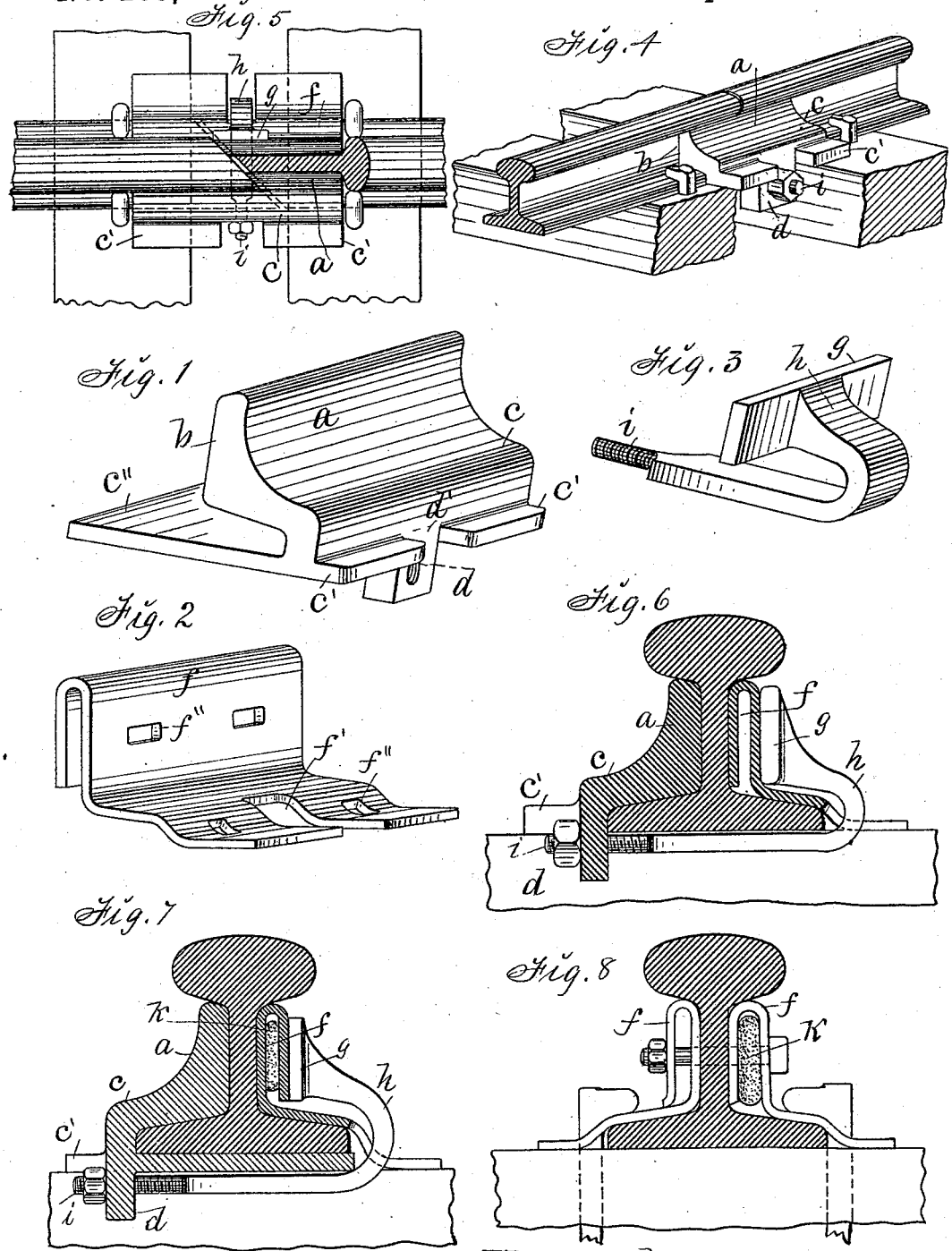

WILLIAM F. GOULD, OF STUART, IOWA.

RAILWAY-RAIL JOINT.

SPECIFICATION forming part of Letters Patent No. 285,406, dated September 25, 1883.

Application filed October 28, 1882. (No model.)

*To all whom it may concern:*

Be it known that I, WILLIAM F. GOULD, of Stuart, in the county of Guthrie and State of Iowa, have invented an improved Railway-Rail Joint, of which the following is a specification.

The object of my invention is, first, to facilitate the connecting of the ends of two rails and the laying of a track; second, to prevent the wearing of the ends of rails incident to the unevenness of abutting ends in a track and their independent vibrations under the pressure of passing wheels and trains of cars and the pounding or undue compression resulting therefrom; third, to prevent the loosening of common nuts on common screws or screw-threaded shanks of clamping-irons. I accomplish the results contemplated by forming and combining a coupling-plate, an elastic coupling-plate, a clamping device, and an elastic cushion with track-rails and cross-ties, as hereinafter fully set forth.

Figure 1 of my accompanying drawings is a perspective view of one of my coupling-plates. Fig. 2 is a perspective view of my elastic coupling-plate. Fig. 3 is a perspective view of my clamping device. Fig. 4 is a perspective of a rail-joint in which the ends of my coupling-plates rest upon parallel cross-ties, and the clamp is applied between the same ties. Fig. 5 is a top view of a joint in which the T-head of one of the rails is removed. Fig. 6 is a transverse section of a joint in which the coupling-plate flanges extend outward on opposite sides of the shank of the clamp to rest on parallel cross-ties. Fig. 7 is a transverse section of a joint in which the rigid coupling-plate, flange, or base-plate extends inward under the bottoms of the abutting ends of the rails to rest upon and form a bridge between two parallel cross-ties. Fig. 8 is a transverse section of a joint in which two of my elastic coupling-plates are placed on opposite sides of rails, and spiked upon the top surface of a cross-tie, and bolted to the vertical portions and sides of the T-rails. Jointly considered, these figures clearly illustrate the construction and operation of my complete invention.

$a$ is the body of my coupling-plate, preferably made of cast-steel. Its inner face, $b$, is flat and designed to fit against the straight sides of the abutting ends of the rails. Its lower portion, $c$, is curved outward and conforms in shape with the lateral extension and base of a rail, as required, to engage and cover the edges of the base of a rail.

$c'$ is a flange extending outward from the base of the body $a\ b\ c$, to engage and rest upon a cross-tie, as clearly shown in Figs. 4, 5, and 6.

$c''$ is a base-plate extending inward from the flanges $c'$ and in the same plane therewith, to adapt the complete coupling-plate to serve as a chair, and also as a fish-plate, as clearly shown in Fig. 7.

$d$ is a perforated lug or ear that extends downward at right angles from the outside and center of the complete device to receive the end of my clamping device.

$d'$ is an opening in the horizontal flange $c'$, to admit a nut to be placed on the ends of the screw-threaded shank of the clamp, as clearly shown in Figs. 4 and 6.

$f$ is my elastic coupling-plate, in the form of a spring, that is made by doubling the end of a steel plate so that the doubled portion will be of U shape in its cross-section. The opposite end of the plate is bent to conform with the top surface of the lateral extension of the base of the rail. $f'$ is a cavity formed in the center of the lower edge and horizontal portion of the spring and plate to admit my clamping device, as clearly shown in Figs. 2, 6, and 7. $f''$ are perforations in the plate, that adapt it to be fastened on top of the cross-ties, as clearly shown in Fig. 8. In place of bending the top of the elastic coupling-plate inward it may be turned outward, as shown in Fig. 7.

$g$ is a flat-faced cross-head or T end on a clamping-hook, $h$, that has a screw-threaded shank, $i$. The horizontal portion or body of the hook has a flat and widened top surface, adapting it to engage the flat bottoms of rails, and to form a support for the two abutting ends of the rails that overlap it when the base-plate $c''$ of my rigid coupling-plate is omitted, as shown in Fig. 6.

To form a rail-joint, and to secure and maintain continuity in the top surface of a track, and to prevent the springing and vibrating of the ends of the rails when under pressure of passing trains and the damages incident thereto, I place two cross-ties in parallel position under the abutting ends of two rails and close enough together to allow the ends of my rigid coupling-plate to rest upon the cross-ties, and also upon the lateral extensions and base portions of the rails. I then place one of my elastic coupling-plates on the opposite side of the abutting ends of the rails, and the T end of my clamp against the outside face of the elastic plate, and the screw-threaded shank of the clamp under the rails and through the perforated ear of the rigid coupling-plate to receive a nut, and when all the parts are thus arranged and combined I simply operate the nut to draw the coupling-plates on the opposite sides of the rails toward each other and close against the sides of the rails, so that the coupling-plates will be wedged firmly between the under faces of the T-heads of the rails and the inclined top surfaces of the webs or lateral extensions of the base of each rail, to prevent any vertical movement of either of the abutting ends of the rails, and also any lateral movement of the same ends without interfering with the longitudinal contraction and expansion of the rails and complete track, as occurs when transverse bolts and longitudinal wedges are used in a joint; and in thus clamping the parts together the spring of the elastic coupling-plate is compressed, and a force stored that will constantly be exerted against the nut to prevent the nut and clamp from becoming loose and the firmness and cohesion of the parts relaxed, and the joint thereby impaired and the continuity of the even top surface of the track broken.

To re-enforce the spring in my elastic coupling-plate, I insert a rubber block, $k$, or suitable cushioning material in the doubled portion of the plate, as shown in Figs. 6 and 8.

To form a joint by means of two of my elastic coupling-plates, and without any other coupling-plate and clamp, I place one of the elastic plates on each side of the abutting ends of two rails resting on a cross-tie, and fasten them to the tie by means of spikes, and then draw their upper portions together to compress them against the rails by means of transverse screw-bolts, as clearly shown in Fig. 8.

I claim as my invention—

1. In a railway-track, the combination of the coupling-plate $a\ b\ c\ d$, the elastic coupling-plate $f\ f'$, the clamp $g\ h\ i$, two abutting rails, and two parallel cross-ties, substantially as shown and described, for the purposes specified.

2. In a railway-track, the combination of a coupling-plate, $a\ b\ c\ d$, an elastic coupling-plate, $f\ f'$, a clamp, $g\ h\ i$, an elastic block, $k$, two abutting rails, and two cross-ties, substantially as shown and described, for the purposes specified.

WILLIAM F. GOULD.

Witnesses:
WILKINS WARWICK,
THOMAS G. ORWIG.